US008213590B1

(12) United States Patent
Huntsman et al.

(10) Patent No.: US 8,213,590 B1
(45) Date of Patent: Jul. 3, 2012

(54) CALL PRIORITIZATION IN A COMMUNICATION NETWORK

(75) Inventors: Russell E. Huntsman, Overland Park, KS (US); Eric Michael Bloomcamp, Olathe, KS (US); Jeffery O. Green, Lee's Summit, MO (US); Pierce Andrew Gorman, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 800 days.

(21) Appl. No.: 12/351,498

(22) Filed: Jan. 9, 2009

(51) Int. Cl.
*H04M 3/42* (2006.01)

(52) U.S. Cl. ......... 379/207.05; 379/207.06; 379/207.07; 379/207.08; 379/399.01; 370/352; 370/412; 370/395.2; 455/426.2; 455/69; 455/449

(58) Field of Classification Search ........ 379/207.05–207.08, 399.01; 370/352, 370/412, 395.2
See application file for complete search history.

(56) References Cited

U.S. PATENT DOCUMENTS

| | | | |
|---|---|---|---|
| 2004/0106403 A1* | 6/2004 | Mori et al. ................. | 455/426.2 |
| 2005/0070230 A1* | 3/2005 | Das et al. .................... | 455/69 |
| 2005/0163126 A1* | 7/2005 | Bugenhagen et al. ..... | 370/395.2 |
| 2005/0213716 A1 | 9/2005 | Zhu et al. | |
| 2005/0286711 A1* | 12/2005 | Lee et al. ................. | 379/399.01 |
| 2006/0050683 A1* | 3/2006 | Wall et al. ................ | 370/352 |
| 2007/0049315 A1* | 3/2007 | Luft et al. ................. | 455/518 |
| 2007/0206620 A1* | 9/2007 | Cortes et al. .............. | 370/412 |
| 2007/0298765 A1 | 12/2007 | Dickinson et al. | |

FOREIGN PATENT DOCUMENTS

WO   2005074231   8/2005

OTHER PUBLICATIONS

Rosenberg et al, RFC 3261, 2002, all pages.*
U.S. Appl. No. 12/233,399, filed Sep. 18, 2008.
CDW-G, "Zoom 5806 VoIP Telephone Adapter with G.711,iLBC and G.729 Codecs," www.cdwg.com, Mar. 25, 2008, 2 pages, http://www.cdwg.com/shop/products/default.aspx?EDC=1067667.

* cited by examiner

*Primary Examiner* — Curtis Kuntz (57) ABSTRACT

A call control system comprises a communication interface and a processing system. The communication interface is configured to receive a first access request from a communication system requesting access to a voice service. The communication interface is configured to, in response to receiving the first access request, transfer a rejection to the communication system that indicates that the voice service is not available. The communication interface is configured to, in response to transferring the rejection, receive a first call request for a priority service from the communication system. The processing system is configured to process the first call request to determine if the first call request indicates the priority service. If the first call request indicates the priority service, then the communication interface is configured to transfer a second access request to a communication network in response to the first call request. The communication interface is configured to, in response to transferring the second access request to the communication network, receive a first successful response from the communication network. The communication interface is configured to, in response to receiving the first successful response, transfer a second call request to the communication network.

16 Claims, 6 Drawing Sheets

CALL PRIORITIZATION IN A COMMUNICATION NETWORK

TECHNICAL BACKGROUND

Many technological advances have resulted in the provisioning and delivery of telephony services over packet networks. However, congested network conditions introduce a new problem when providing telephony services over packet networks. In past circuit switched telephony networks, the circuit network was able to proactively handle congestion in switches through call blocking or call gapping. However, packet networks utilized for telephony service are not equipped with such mechanisms and are only able to operate at a certain capacity and serve a limited number of call requests. Additionally, some providers of telephony services over packet networks utilize a call control system to assist in setting up and tearing down calls, and the call control system may also become congested.

The limit on the capacity of the call control system may be due to the number of processors, protocol stacks, or queues in the call control system, or other reasons. During a mass call event, the number of incoming calls may well exceed the capacity of the call control system or the packet network, which results in the call control system or network entering a state of congestion. Unfortunately, when congestion occurs in the network or call control system, a user attempting to place a high priority call, such as a request for an emergency service, may not be connected to the called party.

OVERVIEW

A method of operating a call control system comprises receiving a first access request from a communication system requesting access to a voice service, in response to receiving the first access request, transferring a rejection to the communication system that indicates that the voice service is not available, in response to transferring the rejection, receiving a first call request for a priority service from the communication system, processing the first call request to determine if the first call request indicates the priority service, if the first call request indicates the priority service, then transferring a second access request to a communication network in response to the first call request, in response to transferring the second access request to the communication network, receiving a first successful response from the communication network, and, in response to receiving the first successful response, transferring a second call request to the communication network.

A call control system comprises a communication interface and a processing system. The communication interface is configured to receive a first access request from a communication system requesting access to a voice service. The communication interface is configured to, in response to receiving the first access request, transfer a rejection to the communication system that indicates that the voice service is not available. The communication interface is configured to, in response to transferring the rejection, receive a first call request for a priority service from the communication system. The processing system is configured to process the first call request to determine if the first call request indicates the priority service. If the first call request indicates the priority service, then the communication interface is configured to transfer a second access request to a communication network in response to the first call request. The communication interface is configured to, in response to transferring the second access request to the communication network, receive a first successful response from the communication network. The communication interface is configured to, in response to receiving the first successful response, transfer a second call request to the communication network.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
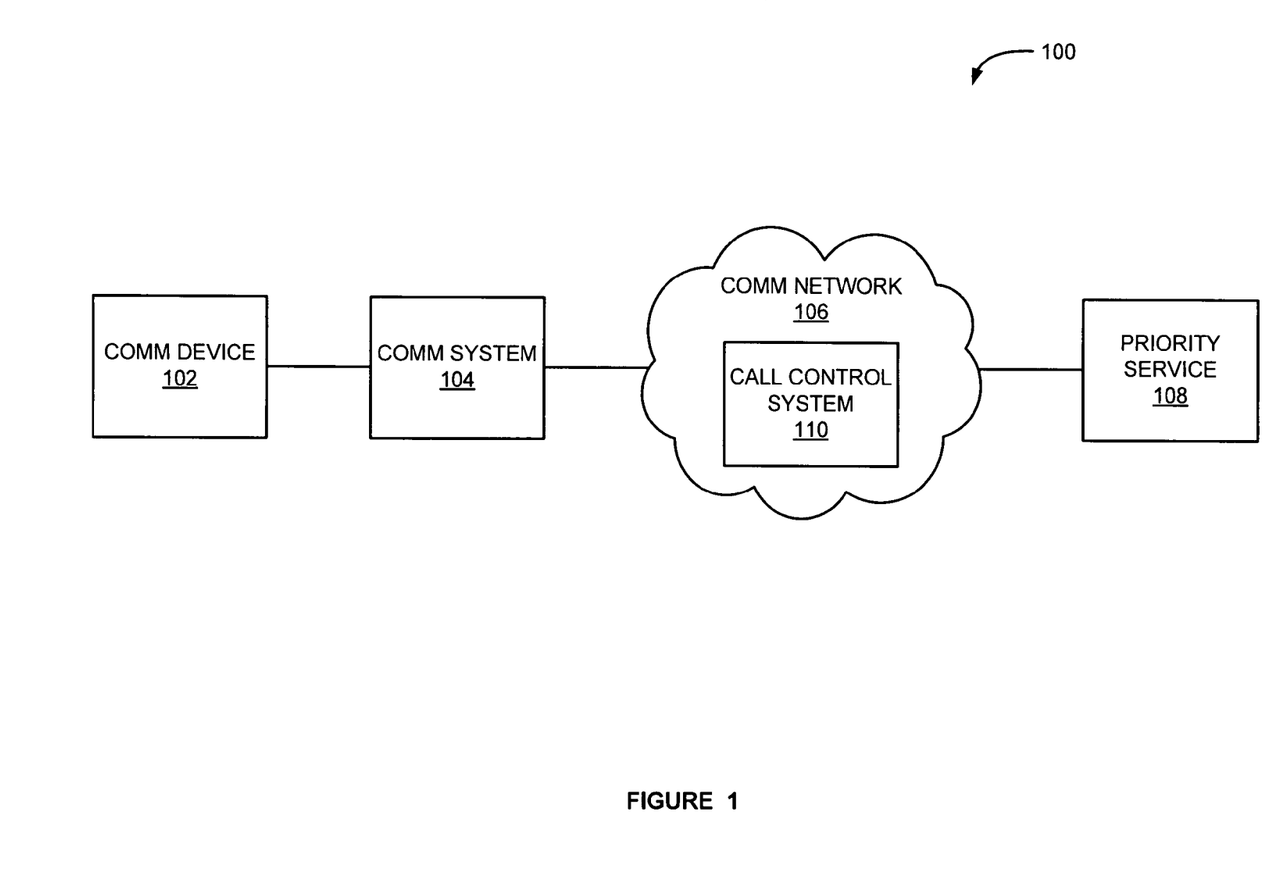
FIG. 1 is a block diagram that illustrates a communication environment.

FIG. 1 is a block diagram that illustrates communication environment 100. Communication environment 100 comprises communication device 102, communication system 104, communication network 106, and priority service 108. Communication network 106 includes call control system 110. Communication network 106 is in communication with communication system 104 and priority service 108. Communication device 102 is in communication with communication system 104.

Communication device 102 is capable of transmitting and receiving voice data. Communication device 102 comprises hardware and circuitry programmed to function as a telecommunications device. For example, communication device 102 comprises a telephone, a wireless telephone, an Internet appliance, a personal digital assistant, a computer, or any other telecommunications device. Communication device 102 may be distributed among multiple devices that together comprise element 102.

Communication device 102 is connected to communication system 104. The link between communication device 102 and communication system 104 may be either a wired or wireless connection. Further, it should be understood that communication device 102 and communication system 104 could be integrated into a single device.

Communication system 104 is capable of providing a gateway function between communication device 102 and communication network 106. Communication system 104 comprises hardware and circuitry programmed to provide a connection between a communication device and a communication network.

Communication system 104 could provide a wired connection. For example, communication system 104 could comprise a terminal adapter, an embedded Multimedia Terminal Adapter (eMTA), a Voice over Internet Protocol (VoIP) residential gateway, a Session Initiation Protocol (SIP) residential gateway, a Data Over Cable Service Interface Specification (DOCSIS) compliant modem, a Digital Subscriber Line (DSL) modem, or an Integrated Services Digital Network (ISDN) modem. Additionally, communication system 104 could comprise a Fiber Optic Modem (FOM), an Optical Network Terminal (ONT), a broadband modem, a router, an adapter, a computer system operating a VoIP application, a line gateway, or any device that provides a gateway function between a communication network and a communication device.

Communication system 104 could also provide a wireless connection. For example, communication system 104 could comprise a Worldwide Interoperability for Microwave Access (WiMAX) modem, an Evolution-Data Optimized (EVDO) modem, a Fourth-Generation (4G) modem, a High-Speed Uplink Packet Access (HSUPA) modem, a High-Speed Downlink Packet Access (HSDPA) modem, a Very Small Aperture Terminal (VSAT) two-way satellite ground station, a cellular modem, or any device that wirelessly provides a gateway function between a communication network and a communication device. Communication system 104 may include the ability to transmit and receive over a single wireless protocol or multiple wireless protocols and may have the ability to simultaneously utilize multiple protocols.

Communication system 104 may be distributed among multiple devices that together comprise element 104. For example, communication system 104 could comprise a VoIP terminal adapter and a broadband modem. Additionally or alternatively, communication system 104 may comprise a single device, such as an eMTA, wherein a terminal adapter is embedded in a broadband modem.

Communication system 104 is connected to communication network 106. The link between communication system 104 and communication network 106 may be either a wired or wireless connection. Communication system 104 provides a gateway function between communication device 102 and communication network 106.

Communication network 106 is capable of providing a communication service to communication device 102 or communication system 104. For example, communication network 106 could comprise a packet-switched network, such as the Internet, a public switched telephone network (PSTN), a PacketCable network, a Network Call Signaling (NCS) network, a personal communication service (PCS) network, a local area network (LAN), a wide area network (WAN), or any other network that provides a communication service to communication device 102 or communication system 104, including combinations of the above. Moreover, communication network 106 could comprise any of the public switched data networks (PSDNs) such as an Internet Protocol network (Internet), Frame Relay, General Packet Radio Service (GPRS), Ethernet, and others. Communication network 106 may utilize many protocols for communication, such as Internet Protocol (IP), Asynchronous Transfer Mode (ATM), frame relay, SIP, VoIP, Media Gateway Control Protocol (MGCP), Signaling Gateway Control Protocol (SGCP), H.248, and H.323, for example.

Communication network 106 comprises call control system 110. Call control system 110 is in communication with communication system 104 and priority service 108.

Call control system 110 comprises hardware and circuitry capable of exerting influence over the data streams that make up a call session. Call control system 110 could comprise a session border controller or any other device that exerts control over signaling and media streams involved in setting up, conducting, and tearing down calls. For example, call control system 110 may modify the stream of signaling data involved in each call, perhaps limiting the kinds of calls that can be conducted, or changing the codec of encoded audio packets. Call control system 110 manages communication traffic between communication system 104 and a called party, such as priority service 108.

Priority service 108 comprises any service which requires prioritized treatment when requested. For example, priority service could comprise a police service, a fire service, an emergency medical service, a Government Emergency Telecommunications Service (GETS), or a Public Safety Answering Point (PSAP). In one example, priority service 108 comprises any emergency service that can be reached through a dedicated emergency telephone number reserved for critical emergency calls. In the United States the universal emergency number is 9-1-1. Areas outside the United States may use different universal emergency numbers. For example, many countries outside the United States use 1-1-2 or 9-9-9 as a universal emergency number. In another example, communication network 106 or call control system 110 could designate certain entities as a priority service, such as a telephone operator or a network administrator.

Figure 2:
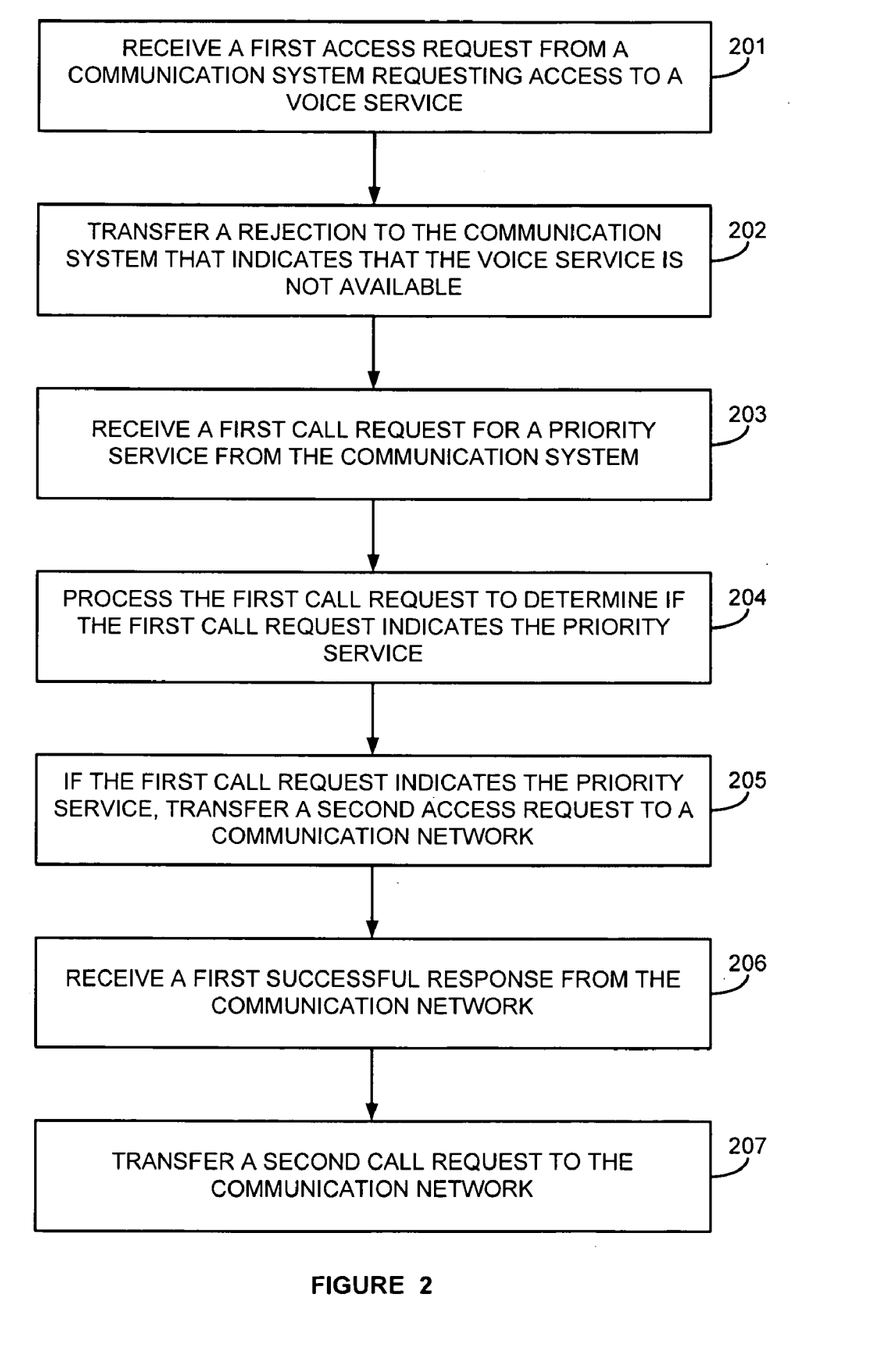
FIG. 2 is a flow diagram that illustrates a method of operating a call control system.

FIG. 2 is a flow diagram that illustrates a method of operating call control system 110. Call control system 110 receives a first access request from communication system 104 requesting access to a voice service (Operation 201). The first access request comprises an off-hook notify or some other message that requests access to the voice service. For example, communication system 104 may transfer the first access request to call control system 110 as a result of a user enabling a data transmission for a communication link using communication device 102 by taking device 102 off-hook. In this case, the off-hook notify message informs call control system 110 that communication device 102 is off-hook and communication system 104 is requesting access to the voice service.

In the event communication network 106 or call control system 110 is unable to service the call, call control system 110 transfers a rejection to communication system 104 indicating that the voice service is not available (Operation 202). The rejection could comprise a Negative Acknowledgement (NACK) or some other message that indicates that the voice service is not available due to network congestion.

Despite transferring the rejection to communication system 104, call control system 110 receives a first call request for a priority service from communication system 104 (Operation 203). As an example, the first call request may comprise a SIP invite message. The first call request comprises dialed digits entered by a user of communication device 102. In one example, the dialed digits are equal to 9-1-1. In another example, the first call request comprises a priority bit. In one embodiment of the invention, the priority bit comprises priority information embedded in the header of the first call request message indicating that the first call request is for a high priority call. For example, the priority code in the header of the first call request message may be a 7xx code, which is currently an unused code in SIP.

In response to receiving the first call request, call control system 110 processes the first call request to determine if the first call request indicates a priority service (Operation 204). For example, the first call request may indicate a priority service if the dialed digits are equal to a predetermined emergency telephone number. In one embodiment, processing the first call request to determine if the first call request indicates the priority service comprises processing the first call request to determine if the dialed digits are equal to 9-1-1. In another embodiment, processing the first call request to determine if the first call request indicates the priority service comprises processing the first call request to determine if the first call request comprises the priority bit. For example, call control system 110 may process the priority information embedded in the header of the first call request to determine if the first call request message is for a high priority call. Advantageously, call control system 110 does not have to process each call request message down to the dialed number to identify high priority calls, but can do so based on a cursory search of the priority information contained in the header. A call request identified as high priority could be serviced by call control system 110 or communication network 106 before any other call request.

If call control system 110 determines that the first call request does not indicate the priority service, then call control system 110 notifies communication system 104 that the voice service is not available by transferring a rejection message to communication system 104. For example, the rejection could comprise a NACK or some other message that indicates that the voice service is not available due to network congestion. Upon receiving the rejection, communication system 104 may provide call treatment to the user of communication device 102 so that the user is aware of the status of the call, such as a fast busy signal or a message informing the user that the voice service is unavailable.

However, if call control system 110 determines that the first call request indicates a request for a priority service, then call control system 110 transfers a second access request to communication network 106 (Operation 205). In one example, the second access request comprises an off-hook notify message. Call control system 110 transfers the second access request to communication network 106 even though communication network 106 or call control system 110 are in a congested state, or approaching a congested state.

The second access request transferred to communication network 106 may be referred to as an out-of-sequence notify message. An out-of-sequence notify implicitly informs communication network 106 of a high priority call request by requesting the voice service outside of the typical sequence for servicing calls. In one example, communication network 106 or call control system 110 could free up enough resources to service the prioritized call request by issuing NACK or similar messages to other pending, low priority call requests, or dropping other currently connected low priority calls.

In response to transferring the second access request for the priority service, call control system 110 receives a first successful response message from communication network 106 indicating readiness to accept the call (Operation 206). In some examples, the first successful response message may comprise a 200 OK message. In other examples, the first successful response message may also comprise a request for dialed digits, wherein the request for dialed digits comprises a new request identifier.

In response to receiving the first successful response message from communication network 106, call control system 110 then transfers a second call request to communication network 106 (Operation 207). In some examples, the second call request comprises the dialed digits entered by a user of communication device 102. In other examples, the second call request includes the new request identifier that was received from communication network 106 in the first successful response message.

In one embodiment, in response to transferring the second call request to communication network 106, call control system 110 receives a second successful response from communication network 106. In some examples, the second successful response message may comprise a 200 OK message. In response to receiving the second successful response message from communication network 106, call control system 110 transfers a third successful response message to communication system 104. In some examples, the third successful response message may comprise a 200 OK message. Call control system 110 then connects communication system 104 to priority service 108, which allows the user of communication device 102 to communicate with personnel at priority service 108.

Figure 3:
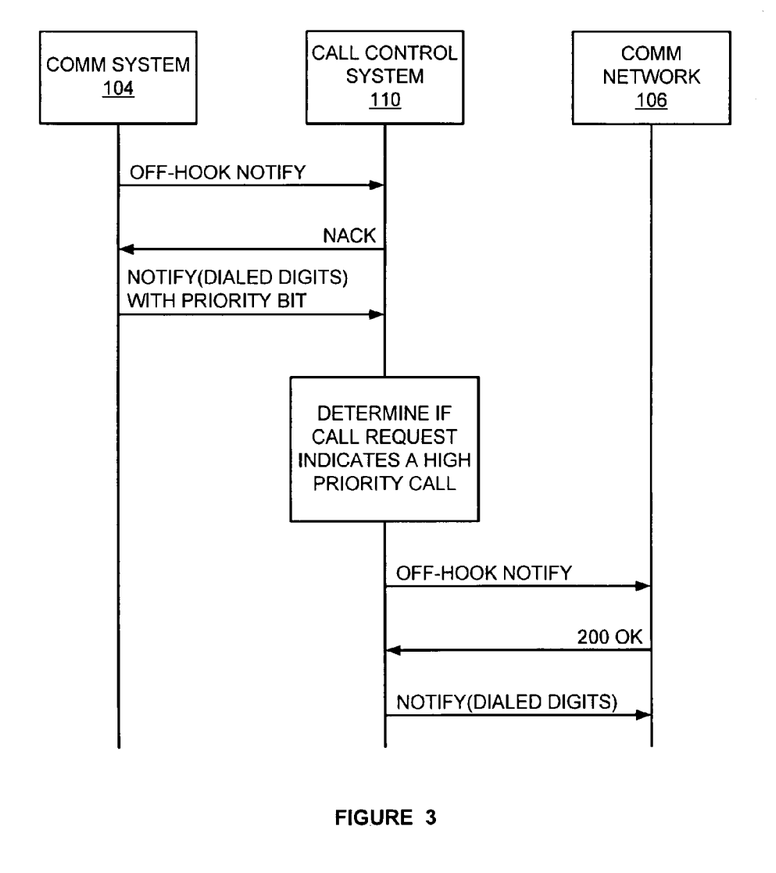
FIG. 3 is a sequence diagram that illustrates a method of operating a communication environment.

FIG. 3 is a sequence diagram that illustrates a method of operating communication environment 100. Employing the method of FIG. 3 helps ensure that a user attempting a high priority call using communication device 102 will successfully connect to the called party, even at times of network congestion.

When communication system 104 receives a request for a voice service from a user, communication system 104 transfers an off-hook notify message to call control system 110. For example, communication system 104 may transfer the off-hook notify to call control system 110 as a result of a user enabling a data transmission for a communication link using communication device 102 by taking device 102 off-hook. In this case, the off-hook notify message informs call control system 110 that communication device 102 is off-hook and communication system 104 is requesting access to the voice service.

In the event communication network 106 or call control system 110 is unable to service the call, call control system 110 transfers a Negative Acknowledgement (NACK) rejection message to communication system 104 indicating that the voice service is not available due to network congestion.

Despite receiving the NACK from call control system 110, communication system 104 transfers a call request notify message to call control system 110. As an example, the notify message may comprise a SIP invite message. The notify message comprises dialed digits entered by a user of communication device 102. The user may indicate the dialed digits by inputting a series of numbers, issuing a voice command, or through some other user interface element. In one example, the dialed digits are equal to 9-1-1. In FIG. 3, the notify message comprises a priority bit. In one embodiment of the invention, the priority bit comprises priority information embedded in the header of the notify message indicating that the call request is for a high priority call. For example, the priority code in the header of the call request notify message may be a 7xx code, which is currently an unused code in SIP.

In response to receiving the call request notify message, call control system 110 processes the notify message to determine if the call request indicates a high priority call. For example, call control system 110 may determine that the call request indicates a high priority call if the dialed digits are equal to a predetermined emergency telephone number. In one embodiment, call control system 110 processes the call request notify message to determine if the dialed digits are equal to 9-1-1. In another embodiment, call control system 110 processes the call request notify message to determine if the call request comprises a priority bit. For example, call control system 110 may process the priority information embedded in the header of the call request notify message to determine if the call request is for a high priority call. Advantageously, call control system 110 does not have to process each call request message down to the dialed number to identify high priority calls, but can do so based on a cursory search of the priority information contained in the header. A call request identified as high priority could be serviced by call control system 110 or communication network 106 before any other call request.

If call control system 110 determines that the call request notify message indicates a high priority call, then call control system 110 transfers an off-hook notify to communication network 106. Call control system 110 transfers the off-hook notify message to communication network 106 even though communication network 106 or call control system 110 are in a congested state, or approaching a congested state.

The off-hook notify message transferred to communication network 106 may be referred to as an out-of-sequence notify message. An out-of-sequence notify implicitly informs communication network 106 of a high priority call request by requesting the voice service outside of the typical sequence for servicing calls. In one example, communication network 106 or call control system 110 could free up enough resources to service the prioritized call request by issuing NACK or similar messages to other pending, low priority call requests, or dropping other currently connected low priority calls.

In response to receiving the off-hook notify message from call control system 110, communication network 106 transfers a 200 OK message to call control system 110, indicating that communication network 106 is ready to accept the call. In response to receiving the 200 OK message from communication network 106, call control system 110 then transfers a call request notify message to communication network 106 comprising the dialed digits entered by a user of communication device 102. Call control system 110 and communication network 106 can then connect communication system 104 to the called party by following standard call processing techniques.

Figure 4:
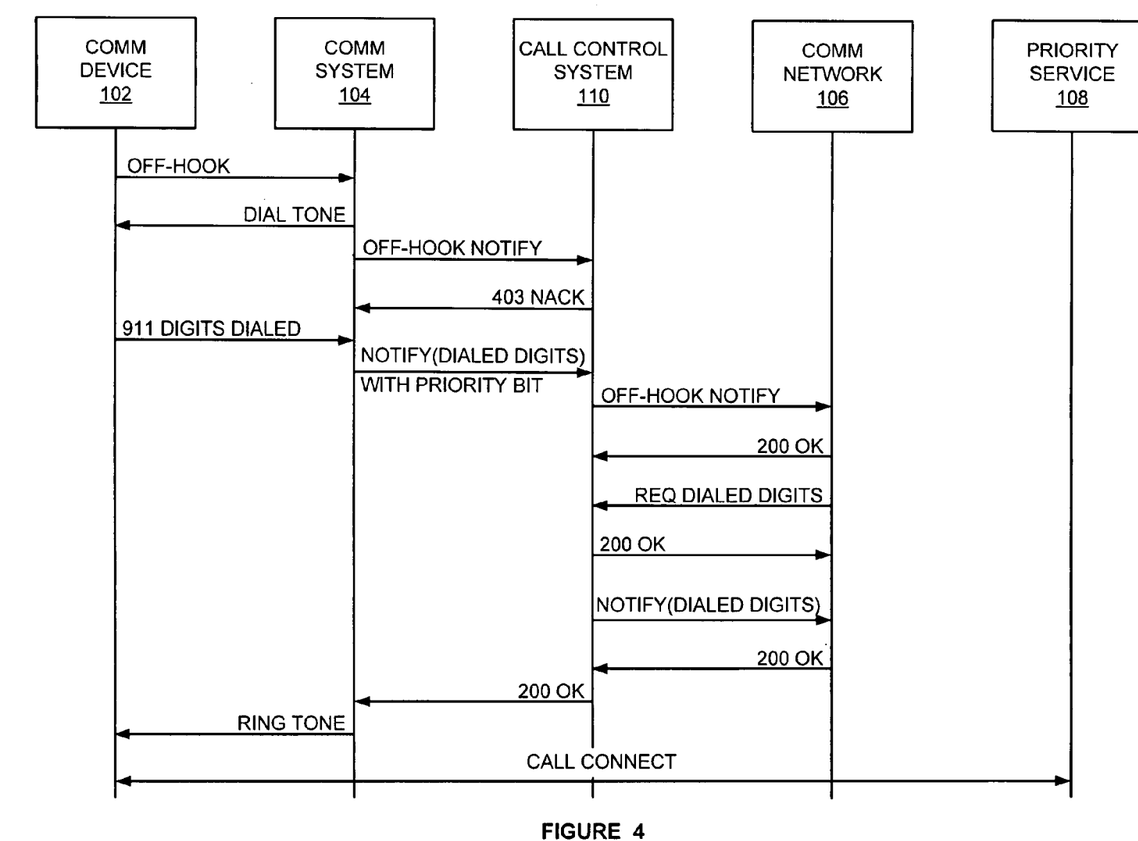
FIG. 4 is a sequence diagram that illustrates a method of operating a communication environment.

FIG. 4 is a sequence diagram that illustrates a method of operating communication environment 100. Employing the method of FIG. 4 helps ensure that a user attempting a high priority call using communication device 102 will successfully connect to priority service 108, even at times of network congestion.

When a user picks up or activates communication device 102, in an attempt to receive a dial tone, communication device 102 transfers an off-hook message to communication system 104. For example, communication device 102 may transfer the off-hook message to communication system 104 as a result of the user enabling a data transmission for a communication link by taking communication device 102 off-hook. When communication system 104 receives the off-hook message indicating a request for a voice service from the user, communication system 104 plays a dial tone sound file, which informs the user of communication device 102 that communication system 104 is ready to accept dialed digits and prompts the user for such input. Communication system 104 also transfers an off-hook notify message to call control system 110. The off-hook notify message informs call control system 110 that communication device 102 is off-hook and requesting access to the voice service.

In the event communication network 106 or call control system 110 is unable to service the call, call control system 110 transfers a 403 NACK message to communication system 104 indicating that the voice service is unavailable due to network congestion.

A user at communication device 102 indicates a call for a priority service, for example, by dialing 9-1-1. The user may indicate a high priority call by inputting a series of numbers, issuing a voice command, or through some other user interface element. Communication device 102 translates the indication into dialed digits. Communication device 102 transfers the dialed digits to communication system 104.

Despite receiving the NACK from call control system 110, communication system 104 transfers a call request notify message comprising the dialed digits to call control system 110. For example, communication system 104 may analyze the dialed digits received from communication device 102 and determine that the dialed digits indicate a priority service. Responsive to determining that the dialed digits indicate a priority service, communication system 104 may set a priority bit in the call request notify message to inform call control system 110 that the call request requires prioritized handling. In one embodiment of the invention, the priority bit comprises priority information embedded in the header of the notify message indicating that the call request is for a high priority call. For example, the priority code in the header of the call request notify message may be a 7xx code, which is currently an unused code in SIP.

In response to receiving the call request notify message, call control system 110 processes the notify message to determine if the call request indicates a priority service. For example, the call request indicates a priority service if the dialed digits are equal to a predetermined emergency telephone number. In one embodiment, call control system 110 processes the call request notify message to determine if the dialed digits are equal to 9-1-1. In another embodiment, call control system 110 processes the call request notify message to determine if the call request comprises a priority bit. For example, call control system 110 may process the priority information embedded in the header of the call request notify message to determine if the call request is for a high priority call. Advantageously, call control system 110 does not have to process each call request message down to the dialed number to identify high priority calls, but can do so based on a cursory search of the priority information contained in the header. A call request identified as high priority could be serviced by call control system 110 or communication network 106 before any other call request.

If call control system 110 determines that the first call request does not indicate the priority service, then call control system 110 notifies communication system 104 that the voice service is not available by transferring a rejection message to communication system 104 (not shown). For example, the rejection could comprise a NACK or some other message that indicates that the voice service is not available due to network congestion. Upon receiving the rejection, communication system 104 provides call treatment to the user of communication device 102 so that the user is aware of the status of the call, such as a fast busy signal or a message informing the user that the voice service is unavailable (not shown).

However, if call control system 110 determines that the call request notify message indicates a request for a priority service, then call control system 110 transfers an off-hook notify to communication network 106, as depicted in FIG. 4. Call control system 110 transfers the off-hook notify message to communication network 106 even though communication network 106 or call control system 110 are in a congested state, or approaching a congested state.

The off-hook notify message transferred to communication network 106 may be referred to as an out-of-sequence notify message. An out-of-sequence notify implicitly informs communication network 106 of a high priority call request by requesting the voice service outside of the typical sequence for servicing calls. In one example, communication network 106 or call control system 110 could free up enough resources to service the prioritized call request by issuing NACK or similar messages to other pending, low priority call requests, or dropping other currently connected low priority calls.

In response to receiving the off-hook notify message from call control system 110, communication network 106 transfers a 200 OK message to call control system 110, indicating that communication network 106 is ready to accept the call. In addition, communication network 106 also transfers a request for dialed digits to call control system 110. In some examples, the request for dialed digits comprises a new request identifier. In response to receiving the 200 OK and the request for dialed digits from communication network 106, call control system 110 transfers a 200 OK message and a call request notify message to communication network 106, wherein the call request notify message comprises dialed digits entered by the user of communication device 102. In some examples, the call request notify message includes the new request identifier that was received from communication network 106 in the request for dialed digits.

In response to transferring the call request notify message to communication network 106, call control system 110 receives another 200 OK message from communication network 106. In response to receiving the 200 OK message from communication network 106, call control system 110 transfers a 200 OK message to communication system 104. Communication system 104 then plays a ring tone sound file which informs the user of communication device 102 that the call is being connected. Call control system 110 and communication system 104 then connect communication device 102 to priority service 108, which allows the user of communication device 102 to communicate with personnel at priority service 108.

Figure 5:
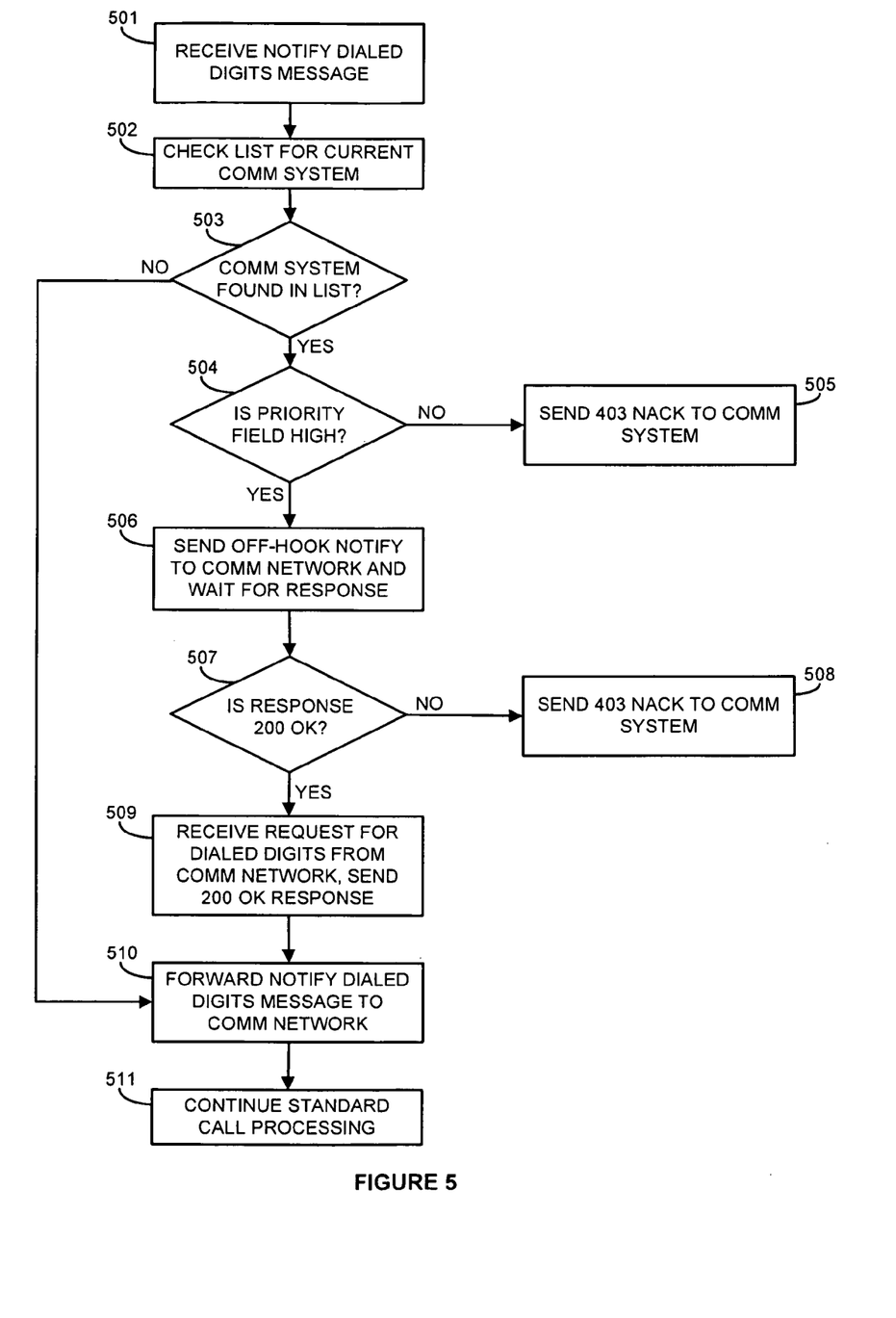
FIG. 5 is a flow diagram that illustrates a method of operating a call control system.

FIG. 5 is a flow diagram that illustrates a method of operating call control system 110. The flow diagram of FIG. 5 comprises an exemplary implementation of control logic for operating call control system 110 as described herein.

As a precursor to performing the steps of FIG. 5, call control system 110 maintains a list that stores a unique identifier of each communication system that call control system 110 has recently sent a 403 NACK message in response to receiving an off-hook notify message. For example, the unique identifier could comprise the phone number of the communication system, the Media Access Control (MAC) address of the communication system, or some other unique identifier. Call control system 110 maintains a current list by discarding unique identifiers from the list after a specified time period, such as thirty seconds. It should be understood that the list referred to in FIG. 5 could comprise any data structure, such as a table or array.

Call control system 110 receives a notify dialed digits message from a communication system (Operation 501). The notify dialed digits message comprises dialed digits entered by a user of communication device 102. In response to receiving the notify dialed digits message, call control system 110 checks the list for the current communication system that transferred the notify dialed digits message (Operation 502). Call control system 110 then determines if the communication system is found in the list (Operation 503). If the communication system is not found in the list, the method proceeds to Operation 510, in which the notify dialed digits message is simply forwarded to communication network 106 (Operation 510), and call control system 110 continues standard call processing (Operation 511).

However, if the communication system is found in the list in Operation 503, then call control system 110 determines a priority field in the notify dialed digits message (Operation 504). The priority field comprises priority information, such as a priority bit, embedded in the header of the notify dialed digits message indicating that notify dialed digits message is for a high priority call. For example, the priority code in the header of the notify dialed digits message may be a 7xx code, which is currently an unused code in SIP. If in Operation 504 the priority field is not determined to be high, then call control system 110 sends a 403 NACK message to the communication system (Operation 505). However, if in Operation 504 the priority field is determined to be high, then call control system 110 sends an off-hook notify to communication network 106 and waits for a response (Operation 506).

When a response is received from communication network 106, call control system 110 determines if the response is a 200 OK message (Operation 507). If the response is not a 200 OK message, call control system 110 sends a 403 NACK to the communication system (Operation 508). However, if the response from communication network 106 is a 200 OK message, then call control system 110 receives a request for dialed digits from communication network 106, and sends a 200 OK message to communication network 106 (Operation 509). Call control system 110 then forwards the notify dialed digits message to communication network 106 (Operation 510). Call control system 110 then continues standard call processing (Operation 511).

Figure 6:
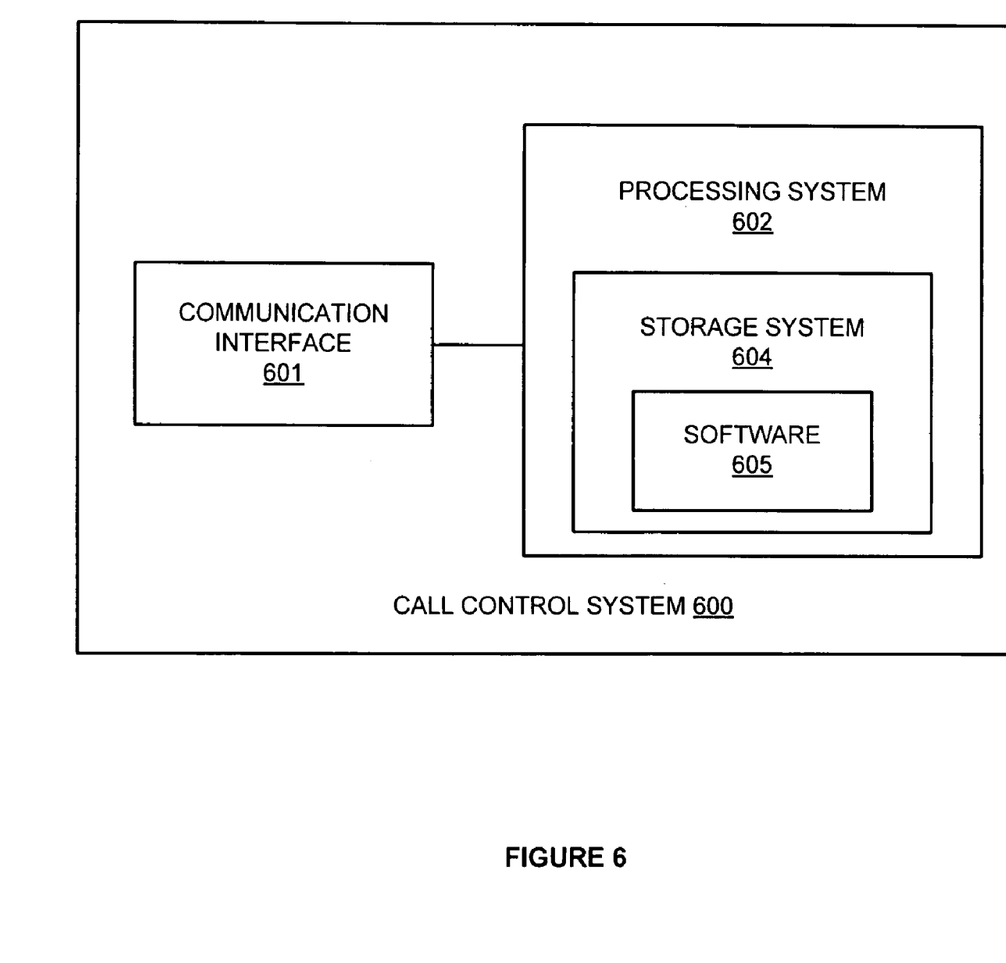
FIG. 6 is a block diagram that illustrates a call control system.

FIG. 6 is a block diagram that illustrates call control system 600. Call control system 600 provides an example of call control system 110, although system 110 may use other configurations. Call control system 600 includes communication interface 601 and processing system 602. Processing system 602 includes storage system 604. Storage system 604 stores software 605. Processing system 602 is linked to communication interface 601. Call control system 600 could be comprised of a programmed general-purpose computer, although those skilled in the art will appreciate that programmable or special purpose circuitry and equipment may be used. Call control system 600 may be distributed among multiple devices that together comprise elements 601-605.

Communication interface 601 could comprise a network interface, modem, port, transceiver, or some other communication device. Communication interface 601 may be distributed among multiple communication devices. Processing system 602 could comprise a computer microprocessor, logic circuit, or some other processing device. Processing system 602 may be distributed among multiple processing devices. Storage system 604 could comprise a disk, tape, integrated circuit, server, or some other memory device. Storage system 604 may be distributed among multiple memory devices.

Processing system 602 retrieves and executes software 605 from storage system 604. Software 605 may comprise an operating system, utilities, drivers, networking software, and other software typically loaded onto a computer system. Software 605 could comprise an application program, firmware, or some other form of machine-readable processing instructions.

When executed by processing system 602, software 605 directs processing system 602 to operate call control system 600 as described herein. In particular, communication interface 601 is configured to receive a first access request from a communication system requesting access to a voice service. The first access request could comprise an off-hook notify message, for example. Communication interface 601 is configured to, in response to receiving the first access request, transfer a rejection to the communication system that indicates that the voice service is not available. The rejection could comprise a 403 NACK message, for example. Communication interface 601 is configured to, in response to transferring the rejection, receive a first call request for a priority service from the communication system. The first call request for the priority service could comprise dialed digits, for example. The first call request may also comprise a priority bit.

Processing system 602 is configured to process the first call request to determine if the first call request indicates the priority service. If the first call request indicates the priority service, then communication interface 601 is configured to transfer a second access request to a communication network in response to the first call request.

Communication interface 601 is configured to, in response to transferring the second access request to the communication network, receive a first successful response from the communication network. The first successful response could comprise a 200 OK message, for example. Communication interface 601 is configured to, in response to receiving the first successful response, transfer a second call request to the communication network. The second call request could comprise dialed digits, for example.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a call control system, the method comprising:
   receiving a first access request from a communication system requesting access to a voice service, wherein the first access request comprises an off-hook notify message;
   in response to receiving the first access request, transferring a rejection to the communication system that indicates that the voice service is not available;
   in response to transferring the rejection, receiving a first call request for a priority service from the communication system;
   processing the first call request to determine if the first call request indicates the priority service;
   if the first call request indicates the priority service, then transferring a second access request to a communication network in response to the first call request, wherein the second access request comprises an out-of-sequence off-hook notify message representing a high priority call request;
   in response to transferring the second access request to the communication network, receiving a first successful response from the communication network; and
   in response to receiving the first successful response, transferring a second call request to the communication network.

2. The method of claim 1 further comprising:
   in response to transferring the second call request to the communication network, receiving a second successful response from the communication network;
   in response to receiving the second successful response from the communication network, transferring a third successful response to the communication system; and
   connecting the communication system to the priority service.

3. The method of claim 1 wherein the first successful response comprises a request for dialed digits, wherein the request for dialed digits comprises a request identifier.

4. The method of claim 3 wherein transferring the second call request comprises transferring dialed digits to the communication network, wherein the second call request includes the request identifier.

5. The method of claim 1 wherein the first call request for the priority service comprises a priority bit.

6. The method of claim 5 wherein processing the first call request to determine if the first call request indicates the priority service comprises processing the first call request to determine if the first call request comprises the priority bit.

7. The method of claim 1 wherein receiving the first call request comprises receiving dialed digits from the communication system.

8. The method of claim 7 wherein processing the first call request to determine if the first call request indicates the priority service comprises processing the first call request to determine if the dialed digits are equal to 9-1-1.

9. A call control system comprising:
   a communication interface configured to receive a first access request from a communication system requesting access to a voice service, wherein the first access request comprises an off-hook notify message;
   the communication interface configured to, in response to receiving the first access request, transfer a rejection to the communication system that indicates that the voice service is not available;
   the communication interface configured to, in response to transferring the rejection, receive a first call request for a priority service from the communication system;
   a processing system configured to process the first call request to determine if the first call request indicates the priority service;
   if the first call request indicates the priority service, then the communication interface configured to transfer a second access request to a communication network in response to the first call request, wherein the second access request comprises an out-of-sequence off-hook notify message representing a high priority call request;
   the communication interface configured to, in response to transferring the second access request to the communication network, receive a first successful response from the communication network; and
   the communication interface configured to, in response to receiving the first successful response, transfer a second call request to the communication network.

10. The system of claim 9 further comprising:
   the communication interface configured to, in response to transferring the second call request to the communication network, receive a second successful response from the communication network, and in response to receiving the second successful response from the communication network, transfer a third successful response to the communication system; and
   the processing system configured to connect the communication system to the priority service.

11. The system of claim 9 wherein the first successful response comprises a request for dialed digits, wherein the request for dialed digits comprises a request identifier.

12. The system of claim 11 wherein the communication interface configured to transfer the second call request comprises the communication interface configured to transfer dialed digits to the communication network, wherein the second call request includes the request identifier.

13. The system of claim 9 wherein the first call request for the priority service comprises a priority bit.

14. The system of claim 13 wherein the processing system configured to process the first call request to determine if the first call request indicates the priority service comprises the processing system configured to process the first call request to determine if the first call request comprises the priority bit.

15. The system of claim 9 wherein the communication interface configured to receive the first call request comprises the communication interface configured to receive dialed digits from the communication system.

16. The system of claim 15 wherein the processing system configured to process the first call request to determine if the first call request indicates the priority service comprises the processing system configured to process the first call request to determine if the dialed digits are equal to 9-1-1.

* * * * *